(12) United States Patent
Chen et al.

(10) Patent No.: US 11,323,609 B2
(45) Date of Patent: May 3, 2022

(54) DEVICE FOR TESTING AUTOFOCUS FUNCTION AND METHOD FOR USING DEVICE

(71) Applicant: TRIPLE WIN TECHNOLOGY(SHENZHEN) CO.LTD., Shenzhen (CN)

(72) Inventors: Jin-Ke Chen, Jincheng (CN); Shin-Wen Chen, New Taipei (TW)

(73) Assignee: TRIPLE WIN TECHNOLOGY (SHENZHEN) CO.LTD., Shenzhen (CN)

( * ) Notice: Subject to any disclaimer, the term of this patent is extended or adjusted under 35 U.S.C. 154(b) by 151 days.

(21) Appl. No.: 16/847,798

(22) Filed: Apr. 14, 2020

(65) Prior Publication Data

US 2021/0203835 A1 Jul. 1, 2021

(30) Foreign Application Priority Data

Dec. 26, 2019 (CN) .......................... 201911368186.5

(51) Int. Cl.
*H04N 5/232* (2006.01)
*H04N 5/225* (2006.01)

(52) U.S. Cl.
CPC ....... *H04N 5/23212* (2013.01); *H04N 5/2254* (2013.01); *H04N 5/2257* (2013.01)

(58) Field of Classification Search
CPC . H04N 5/23212; H04N 5/2254; H04N 5/2257
See application file for complete search history.

(56) References Cited

U.S. PATENT DOCUMENTS

| | | | | |
|---|---|---|---|---|
| 2009/0279075 | A1* | 11/2009 | Tsai | ................... G01M 11/0214 356/124 |
| 2011/0291603 | A1* | 12/2011 | Kura | ...................... G03B 13/34 318/599 |
| 2018/0113381 | A1* | 4/2018 | Li | ........................ H04N 17/002 |
| 2019/0104239 | A1* | 4/2019 | Aschwanden | ..... H04N 5/23299 |

* cited by examiner

*Primary Examiner* — Abdelaaziz Tissire
(74) *Attorney, Agent, or Firm* — ScienBiziP, P.C.

(57) ABSTRACT

A method for testing an autofocus function of a camera module fixes a camera module and at least two test members sequentially spaced at different positions on an axis pointing straight away from the camera. The camera module is controlled to focus and capture images of each test member and record driving currents of the camera module to achieve those focuses at those distances. When a sharpness of image of a test member reaches a preset threshold value a correspondence table between the driving currents and object distances is generated. An autofocus testing device is further provided.

13 Claims, 5 Drawing Sheets

DEVICE FOR TESTING AUTOFOCUS FUNCTION AND METHOD FOR USING DEVICE

FIELD

The disclosure generally relates to quality control for optical devices, and more particularly to an autofocus testing device for testing a camera module and an autofocus testing method.

BACKGROUND

More and more consumer electronic products come equipped with one or more cameras, these are to achieve image-recognition and other functions. Thus, images captured by the cameras need to be clear.

During manufacturing and assembling in the factory, camera modules need to perform an autofocus test and record the corresponding focus movement distance of the camera module, so that the camera module can quickly focus according to the recorded focus distance in the actual application process.

Existing focus testing devices generally place multiple test members at different distances from the camera module by hand or by machine. Each test requires repositioning of the test members, which has low efficiency and inconvenient operation.

BRIEF DESCRIPTION OF THE DRAWINGS

Implementations of the present technology will now be described, by way of embodiments, with reference to the attached figures.

DETAILED DESCRIPTION

Figure 1:
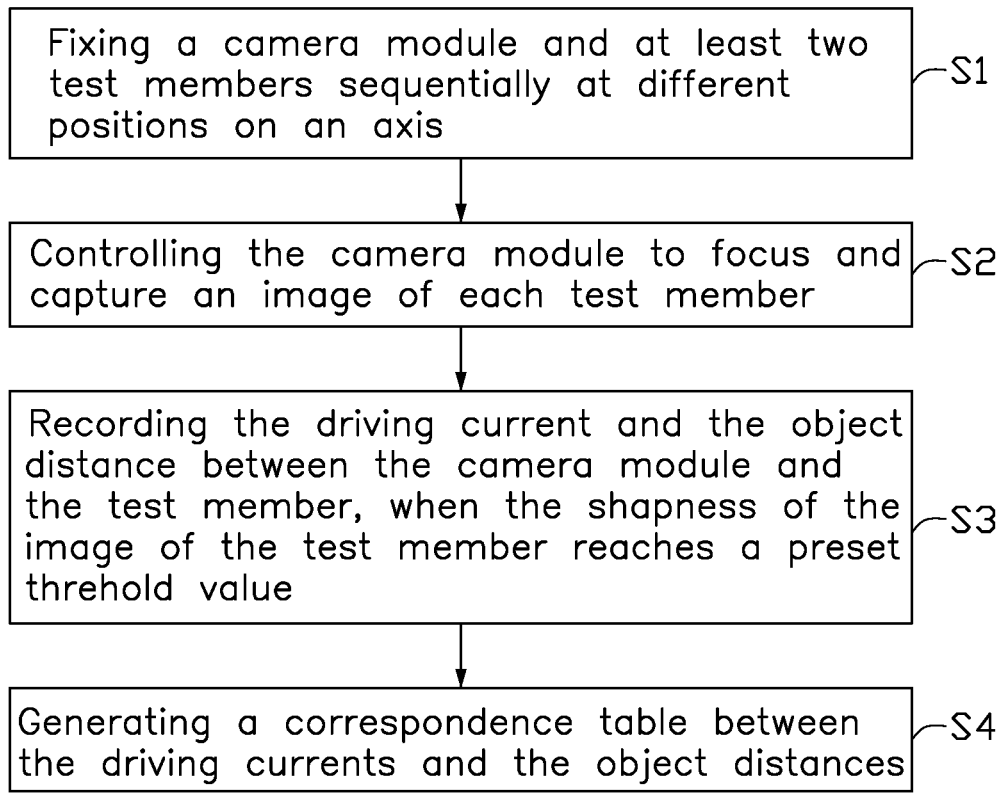
FIG. 1 is a flowchart illustrating an embodiment of a method for testing autofocus function.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series, and the like.

FIG. 1 illustrates an autofocus testing method. The autofocus testing method is configured for controlling an assembled camera module to capture images and record electrical driving currents corresponding to different object distances.

At block S1, a camera module and at least two test members are fixed sequentially at different positions on an axis.

The camera module includes a voice coil motor and a lens. Each test member is a geometric shape, and the at least two test members can be combined to appear as another geometric shape.

At block S2, the camera module is controlled to focus and capture images of each of the at least two test members.

The voice coil motor may drive the lens to move along the axis, thereby the camera module can focus on the test members and photograph the test members to capture images of the test members.

At block S3, when a sharpness of the image of the test member reaches a preset threshold value, the driving current of the camera module and an object distance between the camera module and the test member is recorded.

In one embodiment, the method may further include a step of determining whether the sharpness of the image reaches a preset threshold value. The edges of the geometric shape are grasped and a sharpness of the image of the edges is used to determine the sharpness of the test member in the image and the focal length. When the sharpness of the image of one test member reaches the preset threshold value, the driving current of the camera module at this time is recorded.

At block S4, a correspondence table between the driving currents and the object distances is generated.

The object distance is the distance between the camera module and the testing member. In order to obtain clear images of the testing members at different distances, it is necessary to pass different driving currents to the voice coil motor.

It can be understood that after the voice coil motor is energized, the lens is moved to change the image distance, that is, the focal length of the camera module is changed, so as to adjust the focus. By changing the driving current of the voice coil motor, the distance that the voice coil motor drives the lens can be precisely adjusted.

In one embodiment, the test members include a first test member and a second test member. The first test member is 15 cm away from the camera module on the axis, and the second test member is 35 cm away from the camera module. The camera module focuses twice, and records the driving current corresponding to the first test member and the driving current corresponding to the second test member, respectively.

The preset object distance can be set according to the actual use situation of the camera module. In one embodiment, 15 cm and 35 cm are selected as the two object distances, which are suitable for small camera modules adapted for mobile terminals such as mobile phones. When other types of camera modules need to be tested, suitable test member distances can be selected according to the actual situation.

In one embodiment, the first test member and the second test member are both in the shape of isosceles right-angled triangles. From the perspective of the camera module in the axial direction, the two test members together form a complete square. The camera module may take pictures on the two right-angled edges of the first test member and the two right-angled edges of the second test member to ensure accurate data and avoid errors.

At present, in the field of focus testing, 2-4 distances in testing purposes often meet the testing needs. In other embodiments, when it is necessary to detect test members with more object distances, test members on the axis may be arranged in other shapes as long as they do not block each other. For example, the test members can together appear as a pie chart.

As the correspondence table between the driving currents and the object distances is generated, the performance test of the camera module is completed. The camera module can directly call the corresponding driving current according to the correspondence table when imaging an object with a specific object distance in subsequent use, so that the lens is able to focus quickly, saving the time of focusing.

Figure 2:
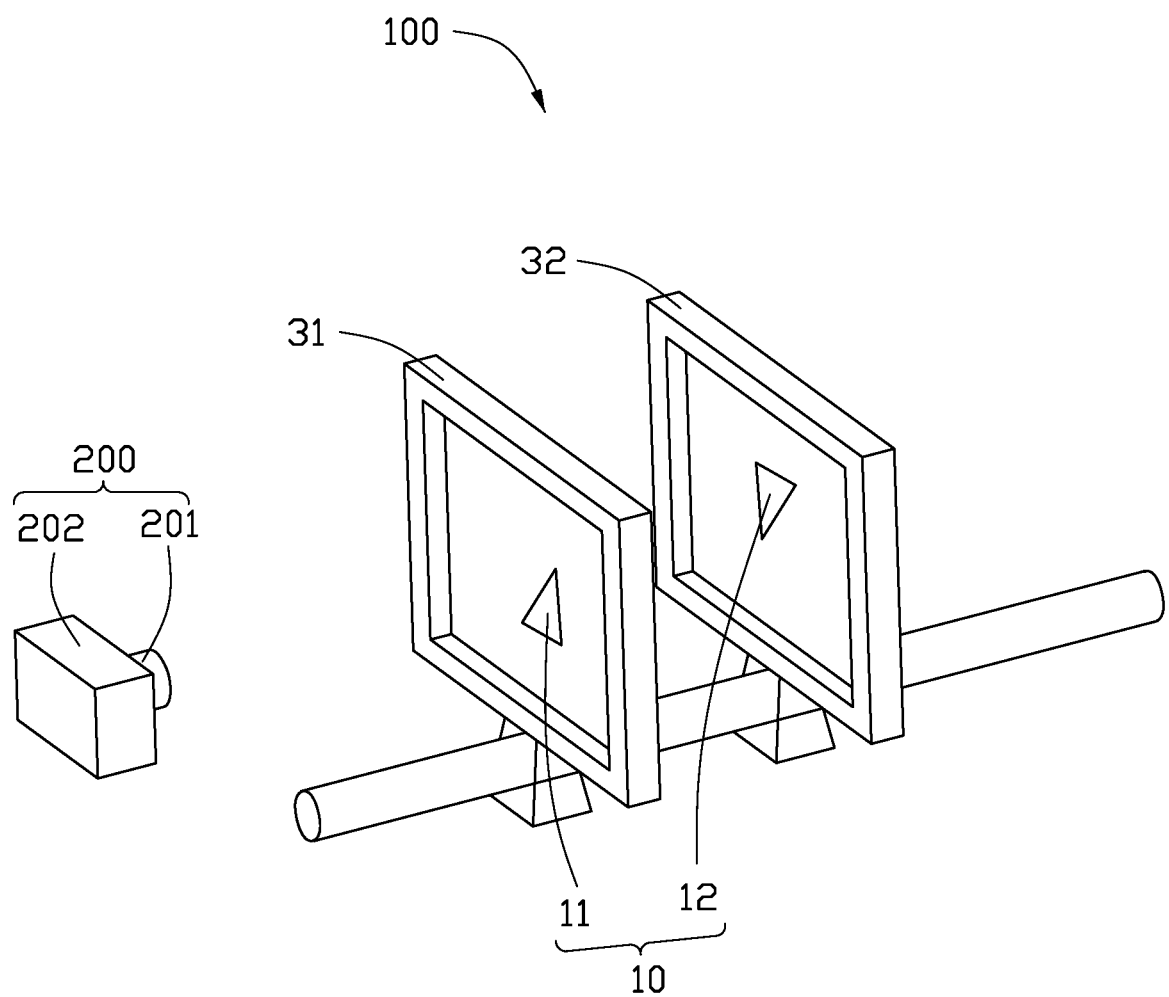
FIG. 2 is a schematic view of an embodiment of an autofocus testing device and a camera module.

FIG. 2 illustrates an autofocus testing device 100. The autofocus testing device 100 includes a test member 10 and a computing device 20. The autofocus testing device 100 is configured to test the autofocus performance of a camera module 200.

The camera module 200 includes a lens 201 and a voice coil motor 202. The voice coil motor 202 is used to drive the lens 201 to a proper focal length so as to take a clear image of an object. By changing the driving current of the voice coil motor 202, precise adjustment of the distance that the voice coil motor 202 drives the lens 201 can be achieved.

The test member 10 includes a first test member 11 and a second test member 12 arranged on an axis. The first test member 11 is 15 cm away from the camera module 200 on the axis, and the more distant second test member 12 is 35 cm away from the camera module 200. That is, the object distance of the first test member 11 is 15 cm, and the object of the second test member 12 is 35 cm.

The preset distance to an object can be set according to the actual use situation of the camera module. In one embodiment, two object distance values of 15 cm and 35 cm are selected, which are suitable for small camera modules adapted for mobile terminals such as mobile phones. When other types of camera modules need to be tested, a suitable test member distance can be selected according to the actual situation.

In one embodiment, the first test member 11 and the second test member 12 are both in the shape of an isosceles right-angled triangle.

At present, in the field of focus testing, 2-4 different distances can often meet the testing needs. In other embodiments, when it is necessary to detect test members with more distance, test members on the axis may be arranged in other shapes as long as they do not block each other. For example, the test members can together appear to be a pie chart.

In one embodiment, the autofocus testing device 100 may further include a transparent plate 31 and a light source plate 32. The first test member 11 is arranged on the transparent plate 31, and the second test member 12 is arranged on the light source plate 32. The light source plate 32 is provided on the peripheral side of the second test member 12 to supplement the brightness of the test members so that the camera module 200 can accurately focus and not suffer from insufficient light blurring the image.

Figure 3:
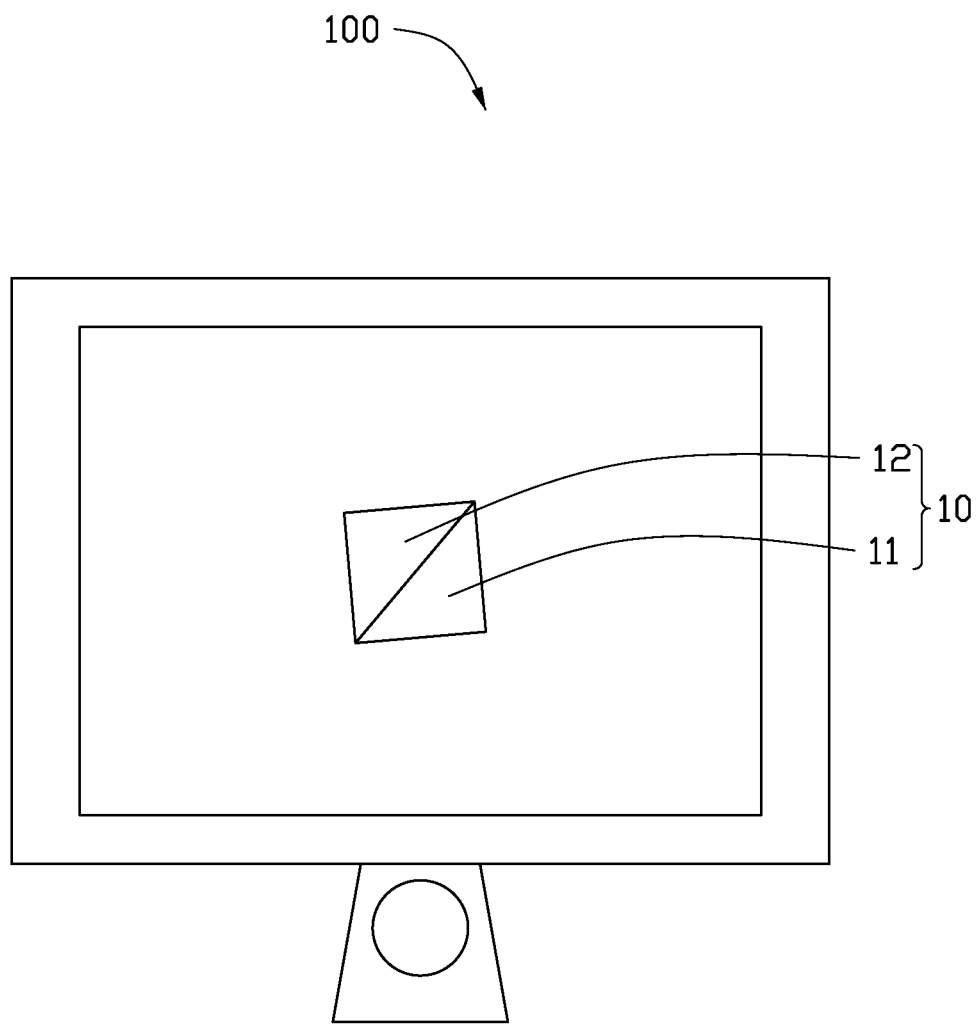
FIG. 3 is a side view of the autofocus testing device and the camera module shown in FIG. 2.

FIG. 3 shows a side view of the autofocus testing device 100. From the perspective of the camera module 200 in the axial direction, the first test member 11 and the second test member 12 together form a complete square. The camera module 200 may take pictures on the two right-angled edges of the first test member and then of the two right-angled edges of the second test member to ensure accurate data and avoid errors.

Figure 4:
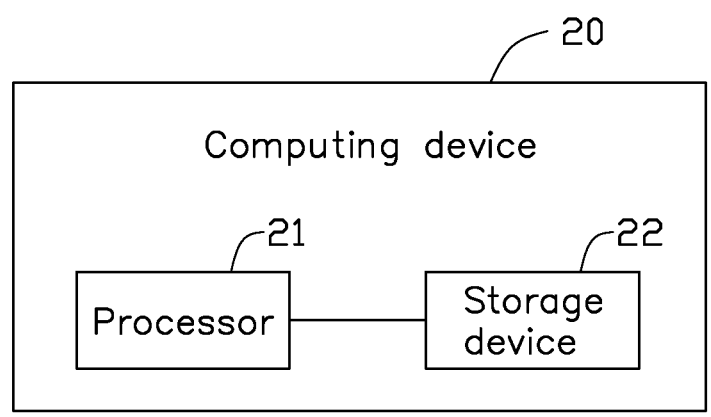
FIG. 4 is a block diagram of a computing device of the autofocus testing device of FIG. 2.

FIG. 4 shows the computing device 20 of one embodiment. The computing device 20 includes a processor 21 and a storage device 22.

The computing device 20 is communicatively connected to the camera module 200 and is configured to receive image data from the camera module 200 and send instructions to the camera module 200.

The processor 21 is configured to execute instructions stored in the storage device 22. The processor 21 receives images captured by the camera module 200, calculates the score awarded for resolution of the image and determines whether the sharpness of the test member in the image reaches a preset threshold value. The processor 21 is further configured to generate a correspondence table between the driving currents and the object distances.

The storage device 22 stores the preset threshold value, and also stores several instructions. The instructions include: recording the driving current of the camera module and an object distance between the camera module and the test member, when the sharpness of the image of the test member reaches a preset threshold value; and generating a correspondence table between the driving currents and the object distances.

The storage device 22 is further configured to store the correspondence table.

The processor 21 may include one or more central processors (CPU), a microprocessor, a digital processing chip, a graphics processor, or a combination of various control chips. The processor 21 may use various interfaces and buses to connect various parts of the autofocus testing device 100.

The storage device 22 stores various types of data in the autofocus testing device 100, such as program codes and the like. The storage device 22 can be, but is not limited to, read-only memory (ROM), random-access memory (RAM), programmable read-only memory (PROM), erasable programmable ROM (EPROM), one-time programmable read-only memory (OTPROM), electrically EPROM (EEPROM), compact disc read-only memory (CD-ROM), hard disk, solid state drive, or other forms of electronic, electromagnetic, or optical recording medium.

After the autofocus detection of the camera module 200 is completed, the correspondence table between the driving currents and the object distances is obtained. When the camera module 200 takes an image of an object with a specific object distance, it can directly call the driving current according to the correspondence table. The driving current enables the lens 201 to focus quickly and saves focusing time.

Figure 5:
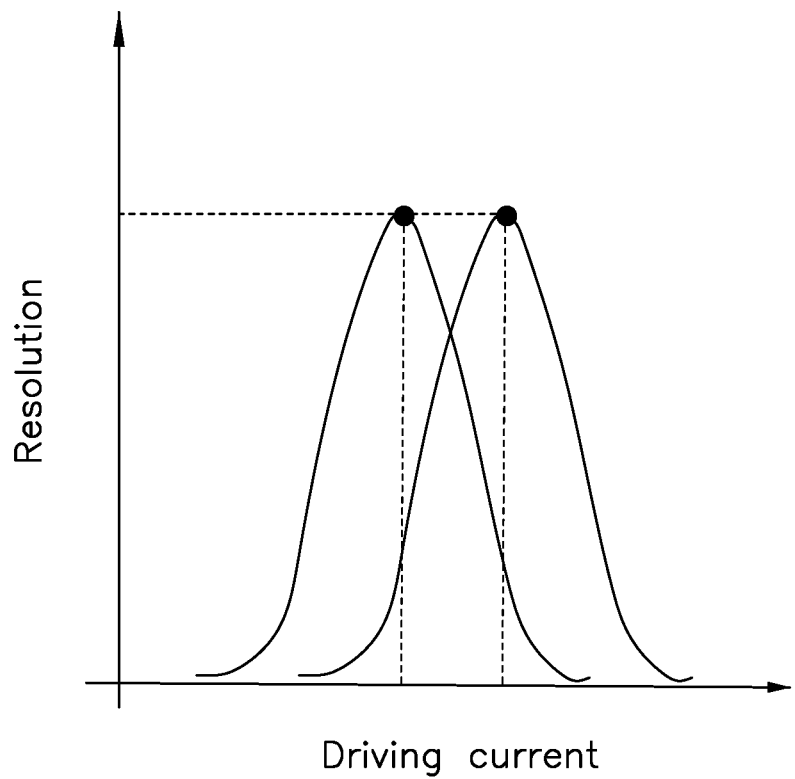
FIG. 5 shows the relationship between the driving current and the resolution of one embodiment.

FIG. 5 illustrates driving currents and the resolution score of the images. The vertical axis is the resolution score of the images captured by the camera module 200, which represents the sharpness of the image. The horizontal axis is the drive current values of the voice coil motor 202, which represents the movement distance of the lens. The right curve is the focus test curve of the first test member 11 at 15 cm away from the camera module 200, and the left curve is the focus test curve of the second test member 12 at 35 cm away from the camera module.

Further, as the driving current increases, the voice coil motor 202 drives the lens 201 to move further, and the resolution score of the second test member first reaches the "extreme value", that is, the sharpness of the second test member 12 in the image at this time is considered to reach the preset threshold value, the driving current at this time and the object distance of 35 cm are recorded. With the further increase of the driving current, the resolution score of the second test member 12 would begin to decrease, and the resolution score of the first test member 11 would increase, until the resolution score of the first test member 11 also reached the corresponding "extreme value", the driving current at this time and the object distance of 15 cm are recorded.

It can be understood that after the voice coil motor is energized, the lens is moved to change the image distance, that is, the focal length of the camera module is changed, so as to adjust the focus. By changing the driving current of the voice coil motor, the distance that the voice coil motor drives the lens can be precisely adjusted.

The autofocus testing device 100 places the camera module 200 and at least two test members at different positions on an axis, so that the camera module 200 can focus on one and then the other of the at least two test members in sequence in one process. The autofocus testing device 100 has a simple structure, and the testing method has fewer steps. The autofocus testing device 100 and testing method can save test time and test cost, and improve the test efficiency. The autofocus testing device 100 and testing method can also reveal defects in the camera module 200.

A person skilled in the art can understand that all or part of the processes in the above embodiments can be implemented by a computer program to instruct related hardware, and that the program can be stored in a computer readable storage medium. When the program is executed, a flow of steps of the methods as described above may be included.

In addition, each functional device in each embodiment may be integrated in one processor, or each device may exist physically separately, or two or more devices may be integrated in one device. The above integrated device can be implemented in the form of hardware or in the form of hardware plus software function modules.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An autofocus testing method, comprising:
   fixing a camera module and at least two test members sequentially at different positions on one axis;
   controlling the camera module to capture images of each of the at least two test members;
   recording a driving current of the camera module and an object distance between the camera module and one of the at least two test members, when a sharpness of the image of the test member reaches a preset threshold value;
   generating a correspondence table between the driving currents and object distances;
   wherein each of the at least two test members has a geometric shape, and the at least two test members can be combined into another geometric shape.

2. The autofocus testing method of claim 1, wherein the camera module comprises a lens and a voice coil motor.

3. The autofocus testing method of claim 2, wherein in a process of controlling the camera module to capture images of each of the at least two test members, the voice coil motor drives the lens to move along the axis to focus and capture images of the test members.

4. The autofocus testing method of claim 2, wherein the step of recording the driving current of the camera module and an object distance between the camera module and one of the at least two test members comprises:
   recording the driving current of the voice coil motor and the object distance between the camera module and the test member.

5. The autofocus testing method of claim 1, wherein the at least two test members comprise a first test member and a second test member, and the first test member is arranged between the camera module and the second test member.

6. The autofocus testing method of claim 5, wherein an object distance between the camera module and the first test member is 15 cm, and an object distance between the camera module and the second test member is 35 cm.

7. The autofocus testing method of claim 5, wherein the first test member is arranged on a transparent plate, and the second test member is arranged on a light source plate.

8. The autofocus testing method of claim 1,
   the method further comprises:
   determining whether the sharpness of the image of the test member reaches the preset threshold value, by grasping edges of the geometric shape and calculating the sharpness of the image of the edges.

9. An autofocus testing device, comprising:
   at least two test members, and
   a computing device;
   wherein a camera module and the at least two test members are fixed sequentially at different positions on one axis, and the camera module is controlled to capture images of each test member;
   the computing device is configured to:
   record a driving current of the camera module and an object distance between the camera module and one of the at least two test members, when a sharpness of the image of the test member reaches a preset threshold value; and
   generate a correspondence table between the driving currents and object distances;
   wherein the each of the at least two test members has a geometric shape, and the at least two test pieces can be combined into another geometric shape.

10. The autofocus testing device of claim 9, wherein the at least two test members comprises a first test member and a second test member, and the first test member is arranged between the camera module and the second test member.

11. The autofocus testing device of claim 10, wherein a distance between the camera module and the first test member is 15 cm, and an object distance between the camera module and the second test member is 35 cm.

12. The autofocus testing device of claim 10, wherein the device further comprises a transparent plate and a light source plate, the first test member is arranged on the transparent plate, and the second test member is arranged on the light source plate.

13. The autofocus testing device of claim 9, wherein the computing device is further configured to:
   determine whether a sharpness of the image of one of the at least two test members reaches the preset threshold value, by grasping edges of the geometric shape and calculating the sharpness of image of the edges.

* * * * *